G. J. N. CARPENTIER.
INSTRUMENT FOR RECORDING THE PATHS OF AEROPLANES.
APPLICATION FILED JAN. 8, 1918.
1,296,477.
Patented Mar. 4, 1919.
2 SHEETS—SHEET 1.
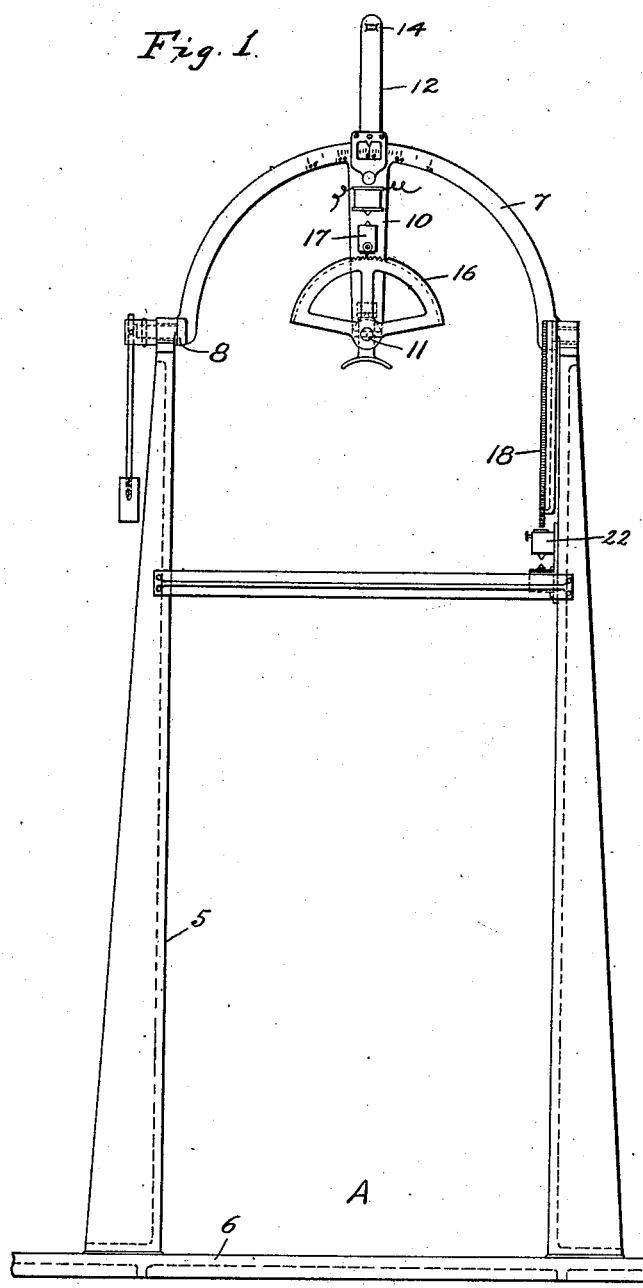
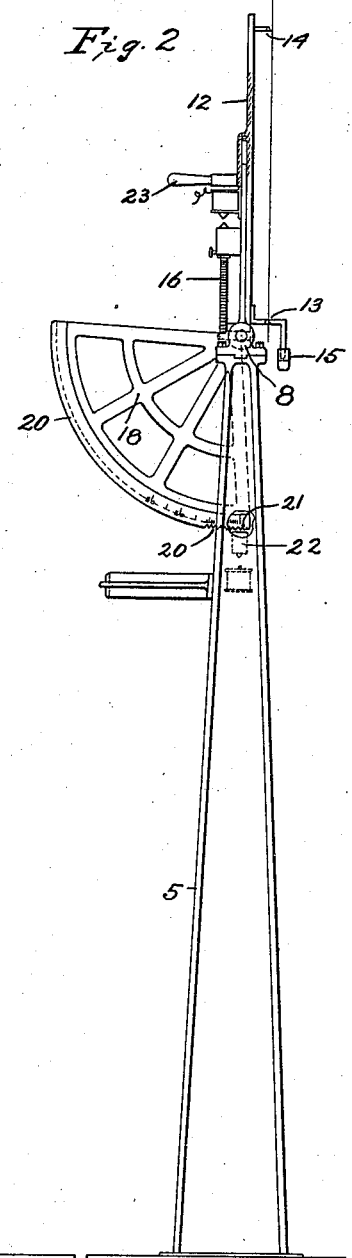
INVENTOR.
G.J.N. Carpentier G. J. N. CARPENTIER.
INSTRUMENT FOR RECORDING THE PATHS OF AEROPLANES.
APPLICATION FILED JAN. 8, 1918.
1,296,477.
Patented Mar. 4, 1919.
2 SHEETS—SHEET 2.
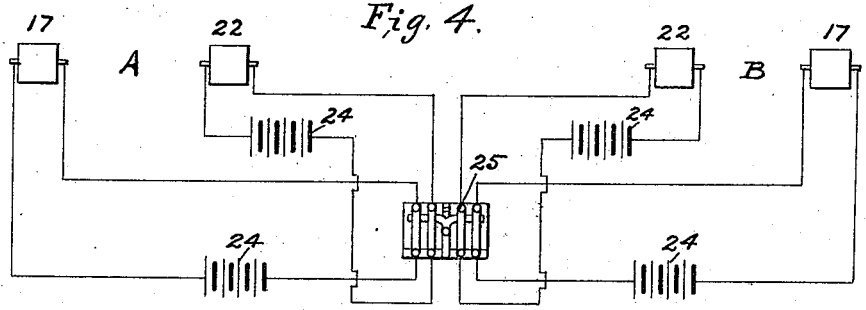
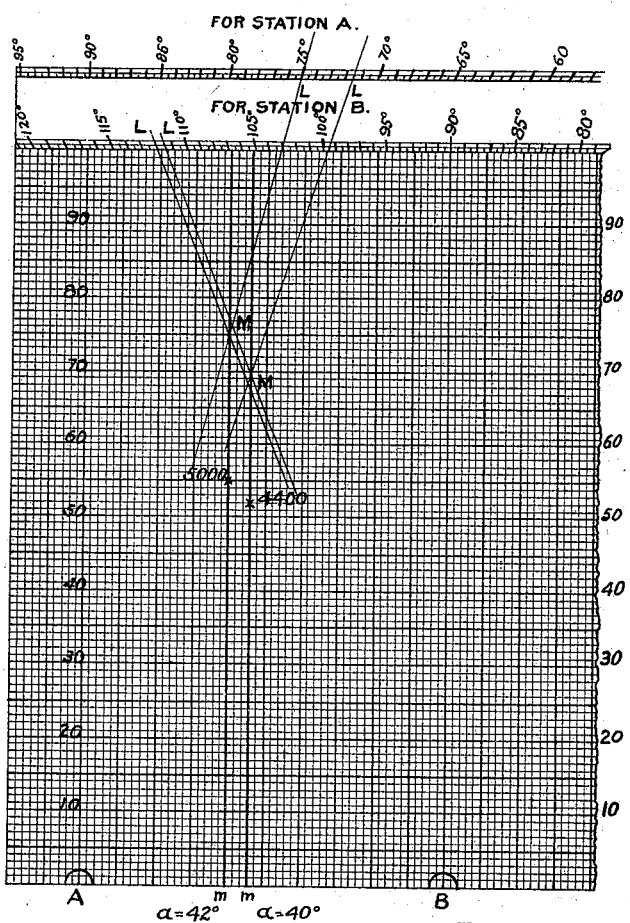
INVENTOR.

UNITED STATES PATENT OFFICE.

GEORGES J. N. CARPENTIER, OF WASHINGTON, DISTRICT OF COLUMBIA, ASSIGNOR TO THE GOVERNMENT OF THE UNITED STATES.

INSTRUMENT FOR RECORDING THE PATHS OF AEROPLANES.

1,296,477. Specification of Letters Patent. Patented Mar. 4, 1919.

Application filed January 8, 1918. Serial No. 210,950.

*To all whom it may concern:*

Be it known that I, GEORGES J. N. CARPENTIER, a citizen of the United States, residing at Washington, in the District of Columbia, have invented certain new and useful Improvements in Instruments for Recording the Paths of Aeroplanes, of which the following is a specification.

This invention relates to a method and apparatus particularly designed for tracing the path of an aeroplane for the purpose, primarily, of enabling one more accurately to determine the results obtained in bomb dropping target practice, although it is susceptible to other uses as will hereinafter appear.

In order that a clearer perception of the present invention may be had, it may be noted that in order to make any progress in skill in dropping bombs upon a predetermined target, no matter the angle at which it is done, one should have means of training the operators just as gunners are trained in the proper use of artillery. To teach each man how to use his apparatus and show him the result of inaccurate estimation, and above all to show him what he can expect under various circumstances, a thorough course in target practice should be taken by every operator when either the climbing or diving method is used at the moment of dropping the bomb. The principal object of practice will be to give the operator full confidence in his ability and convince him of the possibility of hitting the target with the help of simple sighting devices rather than employing complicated instruments of precision.

In order to get the full benefit of target practice, means should be provided for recording the performance or path of travel of the aeroplane and to show the discrepancy between the estimation of the operator as to the distance and relative location of the target with respect to the aeroplane and the actual conditions.

The only known means, at this time, of doing this is to trace the path of the aeroplane with relation to the target for a period of time including the moment the bomb is dropped. In order to do this, the apparatus hereinafter described is employed to locate the relative position of the aeroplane with respect to the target at periodic intervals, thereby obtaining sufficient data to determine the approximate path of travel of the machine during the bomb dropping practice. This with the aviator's data will supply all that is necessary to comment usefully upon the tests.

It is therefore an object of the present invention to provide a simple and practical means for enabling one to definitely determine the approximate path of travel of an aeroplane for a predetermined time. A further object is to provide an apparatus of the above general character having relatively few parts which may be inexpensively made and operated at a minimum amount of trouble. A further object is to provide a simple and practical process whereby the approximate path of travel of an aeroplane may be graphically shown.

Other objects will be in part obvious from the annexed drawings and in part indicated in connection therewith by the following analysis of this invention.

This invention accordingly consists in the steps of the process and their relation to each other and in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figures 1 and 2 are elevational views taken at right angles of one of the observing instruments.

Fig. 3 is a diagrammatic view showing the manner in which the relative location of the aeroplane with respect to the target is obtained.

Fig. 4 is a diagrammatic view illustrating a portion of the wiring.

It is very difficult to follow a flying machine through a telescopic sight, but it may be comparatively easily followed by any open sight instrument. Hence, instead of using a telescope, an open sight instrument is employed in the apparatus, hereinafter described, which can be moved universally about the right angle axes, and means are provided or associated therewith for recording the right ascension and elevational angles made by a plurality of sights at a given time thereby, to locate in space the relative position of the aeroplane with respect to the target at a given time.

To do this, preferably only two instruments A and B of substantially the same construction, such as illustrated in Figs. 1 and 2, are provided mounted one at each end of a base line of known length. These instruments each comprise a pair of uprights 5, which are mounted upon a platform 6. At the upper part of the uprights is a semi-circular arc or arched arm 7 suitably trunnioned in ball bearings 8 of any suitable character whereby it may be swung about a horizontal line therethrough. This arc or arched arm 7 is provided with a downwardly projecting arm 10 terminating at 11 at the axis of the arc 7, at which point is pivoted a sighting member 12, provided with a peep sight 13 and point sight 14 at its opposite ends. It may of course be understood that if desired an open or rifle sight may be used at 13 in place of the peep sight shown. A head rest 15 may be used if desired. This sighting device 12 carries a notched rack 16 having approximately 360 teeth, thus dividing the segment 7 with which it is associated into half degrees. A few of these teeth have been shown, the remainder being indicated diagrammatically in a conventional manner by the dotted arc on the rack. A magnetically operated latch 17 is provided upon the depending arm 10, which may be actuated to lock the sight 12 at predetermined intervals while the right ascension angles are being read.

The arc 7 carries at one end a second arc or segment 18, adjacent to which is a rack 20 movable with respect to a zero point 21 upon the upright 5. Magnetic means 22 are also associated with this rack 20, which is provided with approximately 180 teeth, thus dividing this scale 18 into half degrees. In this case also only a few of the teeth have been shown, the rest being indicated diagrammatically by the dotted lines on the rack. The two magnets of each instrument are so connected in circuit as to be actuated at the same time.

It may be seen from the above that the segment or rack 16 is used to indicate the right ascension of the aeroplane, that is, the angle measured in a plane passing through bearings 8 of the observing instrument and through the aeroplane, the straight line passing through bearings 8 and pivot point 11 being one defining line, and the straight line passing through the aeroplane and pivot point 11 being the other defining line. Segment 18, as will be understood, is used to indicate the angle of elevation of the aeroplane as sighted, measured in a vertical plane passing through pivot point 11 and the aeroplane.

It is, of course, understood that ball bearings will be used in connection with the movable parts which are so well balanced that a movement of the sight 12 through the medium of a handle 23 will enable one to keep the sight on the aeroplane at all times with a minimum amount of trouble.

According to the size of the target ground, the two instruments, which are substantially identical, are for accuracy preferably located several thousand feet apart, in such a way that the center line through the bearings 8 of both instruments will terminate in one horizontal straight line to form a baseline of known length. This arrangement will enable both instruments to register the same angle of elevation at the same time, and when directed to the same point in space, the right ascension to be measured in one plane passing through the machine and through both axes 8—8 of the instruments. In order to determine the exact position of the machine, the angles must be measured at exactly the same time. This is done in the following manner:—Each electromagnet has its own circuit, as shown more clearly in Fig. 4, which is closed when the locking bolt is held in engagement with its rack by the magnet. The four circuits each have batteries 24 and pass independently through an instrument 25 called a disjuncture, by means of which they may be actuated simultaneously. This disjuncture is in the nature of a switch, in my case operated either manually or automatically at stated intervals to break the circuits simultaneously. Actuation of the disjuncture releases locking bolts which have been magnetically held in retracted position, which bolts thereupon move forwardly under action of springs to effect the locking of the sighting elements in fixed position.

Each instrument is attended preferably by a pointer, a reader and a recorder, the pointers of the two instruments keeping the instruments trained on the aeroplane whose operations are to be observed. When the appointed time for the operation has arrived, the disjuncture is operated to break the circuit whereby both instruments A and B are simultaneously locked in sighted position. The readers then note the angle of elevation and release the locking mechanism 22, and then read the right ascension and release the locking mechanism 17 associated therewith, after which the pointers may again start to follow the aeroplane. This operation is repeated at regular intervals, and as often as possible, probably at intervals of five to ten seconds.

Having ascertained the right ascension and elevation angles of the different positions, the remaining portion of the problem may be easily supplied from trigonometrical tables or preferably by mechanical computation, as indicated in Fig. 3. The partially shown chart indicates the two stations A and B, and is divided into squares of any desired scale. From A and B two lines are drawn, with the points A and B as center pivots. The angles LAB and LBA denote the right ascension of one elevation and the intersection M gives the position of the machine on a plane passing through the aeroplane and through the base line A B. M*m* is the hypotenuse of a right-angle triangle having the angle of elevation of the observation for the angle at *m*, consequently the projection of the machine on the horizontal plane is somewhere on the line M*m* at a distance from M equal to M*m* cosine (angle of elevation), while the altitude of the machine is M*m* sine (angle of elevation). From this it will be seen that the approximate path of travel of the aeroplane for a given time may be definitely determined and chartered by a series of observations. Likewise by observation, the moment the bomb is dropped may also be indicated with respect to the interval of time nearest the last observation and from the hit obtained with respect to the target. Accurate comparison may be made between the aviator's estimation of his location with respect to the target and the actual state of conditions. As is well known, the upward or downward flight of the aeroplane at the moment a bomb is dropped will materially affect the trajectory of the bomb, as will also the windage and the speed and elevation of the aeroplane, and it is to enable the aviator to check up his estimation of conditions and relative position with respect to his actual position that this invention is directed. This apparatus will also be of material help in training anti-aeroplane gunners in estimating the altitude of a machine as their estimation may be checked up immediately.

It is thus seen that the present invention provides a simple and practical apparatus designed to accomplish among others the objects and advantages herein set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim as my invention:—

1. The herein described process, which consists of taking sights at an aeroplane moving in space at substantially equal intervals to determine both the right ascension and elevational angles at two points spaced a known distance apart, and recording and plotting such data thereby to graphically show the approximate path of travel of the aeroplane.

2. In an apparatus of the character described, in combination, a plurality of sighting instruments capable of rotation about axes at substantially right angles whereby to observe an aeroplane in flight, and means for simultaneously locking said sighting means whereby the angles of right ascension and elevation may be determined for any particular instant.

3. In an apparatus of the character described, in combination, two sighting instrumentalities positioned at the ends of a known base line, each instrument comprising a standard carrying a sight pivotally supported to turn about axes positioned at substantially right angles to each other, one of which is horizontal and the other of which is positioned according to movement of said sight about the first.

4. In an apparatus of the character described, in combination, two sighting instrumentalities positioned at the ends of a known base line, each instrument comprising a standard carrying a sight pivotally supported to turn about axes positioned at substantially right angles to each other, one of which axes is horizontal and fixed and the other of which is movable in a vertical plane, and scales associated with the pivotal points from which the angles of elevation and azimuth may be read.

5. In an apparatus of the character described, in combination, two sighting instrumentalities positioned at the ends of a known base line, each instrument comprising a standard carrying a sight pivotally supported to turn about axes positioned at substantially right angles to each other, one of which axes is horizontal and fixed, and the other of which is movable in a vertical plane, scales associated with the pivotal points from which the angles of elevation and right ascension may be read, and means for locking the sighting instrumentalities in fixed position while said angles are being read.

6. In an apparatus of the character described, in combination, two sighting instrumentalities positioned at the ends of a known base line, each instrument comprising a standard carrying a sight pivotally supported to turn about axes positioned at substantially right angles to each other, one of which is horizontal and fixed and the other of which is movable in a vertical plane, scales associated with the pivotal points from which the angles of elevation and right ascension may be read, and electrically operated means associated with said sighting means of both instrumentalities for simultaneously locking said sighting means in position thereby to definitely determine the said angles at any instant.

7. A sighting device for observing an aeroplane in flight, comprising in combination, an arched arm movable in one plane and provided with means for indicating its position, a second arm pivotally associated with said first arm to move in a plane at right angles to said first plane, and provided with sighting means, and means on said first arm for indicating the position of said second arm.

8. A sighting device for observing an aeroplane in flight, comprising in combination, a pivotally mounted member provided with an arched arm, means for indicating the angular position of said member, a second member, provided with sighting means, pivotally mounted on said first member to turn at right angles to said first member, and means for indicating the angular position of said second member.

9. A sighting device for observing an aeroplane in flight, comprising in combination, a member pivotally mounted to turn in one plane provided with an arc-shaped member and a depending arm, means for indicating the angular position of said first member in said plane, a second member pivotally mounted on said arm to move in a second plane at right angles to said first plane and provided with sighting means, and means for indicating the angular position of said second member in said second plane.

10. A sighting device for observing aeroplanes, comprising in combination, a pivotally mounted member provided with an arched arm, a calibrated segment movable by said member for indicating the angular position of said member, a second member, provided with sighting means, pivotally mounted on said first member to turn at right angles to said first member, and means for indicating the angular position of said second member.

11. A sighting device for observing aeroplanes, comprising in combination, a pivotally mounted member provided with an arched arm, a calibrated segment movable by said member for indicating the angular position of said member, a second member, provided with sighting means, pivotally mounted on said first member to turn at right angles to said first member, and calibrations on said arc-shaped member for indicating the angular position of said second member.

12. A sighting device for observing aeroplanes, comprising in combination, a pivotally mounted member provided with an arched arm, a calibrated segment movable by said member for indicating the angular position of said member, a second member, provided with sighting means, pivotally mounted on said first member to turn at right angles to said first member, means for indicating the angular position of said second member, and a head rest associated with said sighting means.

13. A sighting device for observing aeroplanes, comprising in combination, an arched arm movable in one plane and provided with means for indicating its position, a second arm pivotally associated with said first arm to move in a plane at right angles to said first plane and provided with sighting means, means on said first arm for indicating the position of said second arm, and means for simultaneously locking said arms in stationary position.

14. A sighting device for observing aeroplanes, comprising in combination, an arched arm movable in one plane and provided with means for indicating its angular position, a second arm pivotally associated with said first arm, provided with sighting means, to move in a plane at right angles to said first plane, means on said first arm for indicating the angular position of said second arm, and electrically operated means for simultaneously locking said arms in fixed position whereby the angular position of said arms may be read.

Signed at Washington, D. C., this 12th day of November, 1917.

GEORGES J. N. CARPENTIER.

Copies of this patent may be obtained for five cents each, by addressing the "Commissioner of Patents, Washington, D. C."